United States Patent [19]
Müller et al.

[11] Patent Number: 6,046,264
[45] Date of Patent: Apr. 4, 2000

[54] THERMOPLASTIC MOULDING MATERIALS BASED ON POLYETHYLENE TEREPHTHALATE FOR USE IN INJECTION MOULDING OF PARTS

[75] Inventors: Norbert Müller, Friedelsheim; Jochen Eicher, Wachenheim; Karl-Heinz Sartor, Ludwigshafen, all of Germany

[73] Assignee: EMTEC Magnetics GmbH, Germany

[21] Appl. No.: 09/091,283

[22] PCT Filed: Dec. 16, 1996

[86] PCT No.: PCT/EP96/05636

§ 371 Date: Jun. 16, 1998

§ 102(e) Date: Jun. 16, 1998

[87] PCT Pub. No.: WO97/23566

PCT Pub. Date: Jul. 3, 1997

[30] Foreign Application Priority Data

Dec. 22, 1995 [DE] Germany ............ 195 48 319

[51] Int. Cl.$^7$ ...................... C08K 3/10
[52] U.S. Cl. ............ 524/407; 524/406; 524/430; 524/539
[58] Field of Search ................... 524/407, 406, 524/430, 539

[56] References Cited

U.S. PATENT DOCUMENTS

| | | | |
|---|---|---|---|
| 3,034,988 | 5/1962 | Ingraham et al. | 252/62.5 C |
| 3,819,312 | 6/1974 | Arpajian | 425/543 |
| 4,227,923 | 10/1980 | Watanabe et al. | 420/38 |
| 4,279,801 | 7/1981 | Kramer et al. | 524/539 |
| 4,427,361 | 1/1984 | Saito | 425/549 |
| 4,525,424 | 6/1985 | Bradshaw | 428/425.9 |
| 4,542,177 | 9/1985 | Kriek et al. | 524/605 |
| 4,737,540 | 4/1988 | Yoshida et al. | 524/537 |
| 5,132,353 | 7/1992 | Wallace | 524/432 |
| 5,538,784 | 7/1996 | Subramanian | 428/297.4 |

FOREIGN PATENT DOCUMENTS 303 449 2/1989 European Pat. Off. .
488 711 6/1992 European Pat. Off. .

OTHER PUBLICATIONS

Saechtling, International Plastics Handbook, 2nd Edition, Hanser, pp. 86, 249, 1992.
Kirk–Othmer, Encyclopedia of Chemical Technology, 3rd Edition, vol. 6, Wiley–Interscience, p. 85, 1979.
Murphy, The Additives for Plastics Handbook, Elsevier, pp. 23, 33,240, and 242, 1996.
Burns, Polyester Molding Compounds, Marcel Dekker, p. 7, 1982.
Rosato, Plastics Processing Data Handbook, Chapman & Hall, pp. 77 and 83–84, 1997.
Ultradur, Polybutylenterephthalat (PBT) Sortimentsuebersicht, Apr. 1994, pp. 1–19.
JP 71 67827, Derwent Abstract.
JP 91 055800, Derwent Abstract.
JP 86 262048, Derwent Abstract.
JP 89 079559, Derwent Abstract.
JP 92 029437, Patent Abstracts of Japan.

*Primary Examiner*—David W. Wu
*Assistant Examiner*—Ling Sui Choi
*Attorney, Agent, or Firm*—Keil & Weinkauf

[57] ABSTRACT

A thermoplastic molding material based on polyethylene terephthalate contains preferably from 37 to 96% by weight of PET, from 1 to 20% by weight of a polymer material containing preferably polyurethane, and from about 4 to 30% by weight of a pigment-like reinforcing agent comprising metal and/or metal oxide. The molding materials are suitable for processing by injection molding, and the shaped articles produced therefrom have advantageous properties, in particular with regard to a higher density compared with a similar polybutylene terephthalate (PBT) having glass fibers as a filler.

The thermoplastic molding material can advantageously be used for small parts and for housing parts for electronic equipment and data devices.

22 Claims, No Drawings

THERMOPLASTIC MOULDING MATERIALS BASED ON POLYETHYLENE TEREPHTHALATE FOR USE IN INJECTION MOULDING OF PARTS

The present invention relates to thermoplastic molding materials and injection molded articles produced therefrom.

Plastics blends comprising predominantly polyalkylene terephthalate are known. PET and PBT blends with about 30% of added glass fibers for increasing the strength, the stability and the modulus of elasticity are known. PBT blends are preferred for injection moldings since they can be more readily processed than PET blends, but they have lower strength.

Ultradur® B4300G2 is a glass fiber-reinforced PBT molding material from BASF Aktiengesellschaft. This molding material is free-flowing, suitable for injection molding and contains 10% by weight of glass fibers. The industrial shaped articles produced therefrom are rigid, tough and dimensionally stable, for example for program switches, toggles, buttons, thermostat parts and handles of heating apparatuses (cf. BASF Kunststoffe, Ultradur® Polybuthylenterephthalat (PBT) Sortimentsubersicht, Produktmerkmale Verwendung Richtwerte, April 1994).

It is an object of the present invention to provide a PET blend which is more economical to produce and which in some cases has more advantageous parameters than known PBT blends.

We have found that this object is achieved by a thermoplastic molding material which essentially contains from 37 to 96% by weight of a thermoplastic polyethylene terephthalate as component A), from 1 to 20% by weight of a polymer material as component B) and from 4 to 30% by weight of a pigment-like reinforcing agent as component C).

This gives a very advantageous and readily injection moldable molding material which differs substantially from known molding materials. Thermoplastic molding materials which are likewise advantageous and are intended for injection molding of shaped articles contain predominantly a thermoplastic polyethylene terephthalate (PET), pigments and a polymer material in a weight ratio of from 60 to 77% by weight of polyethylene terephthalate,
from 4 to 12% by weight of polymer material and
from 4 to 21% by weight of a pigment reinforcing agent, the
   shaped articles produced therefrom being injection moldable at from above 245 to 300° C.

Other advantageous thermoplastic molding materials for injection molding of shaped articles, containing predominantly a thermoplastic polyethylene terephthalate and a polymeric material, comprise a weight ratio of from 50 to 60% by weight of polyethylene terephthalate,
from 10 to 20% by weight of polymer material and
from 20 to 30% by weight of a pigment-like reinforcing agent, the shaped articles being injection moldable at a melt temperature of from about 245 to 300° C.

It is advantageous if the molding materials contain predominantly polyurethane as the polymer material so that they are readily injection moldable and easily processable. It is also advantageous if the moisture content of the molding materials is not more than 0.1, in particular 0.05, % by weight.

The pigment reinforcing material advantageously consists of metal pigments and/or metal oxide pigments.

In an advantageous embodiment, the pigments may have a mean average particle size of less than or equal to 400 μm. This makes it possible to achieve a uniform pigment distribution.

It is also advantageous if the pigments have a length/width ratio of from about 5:1 to about 15:1.

The properties of the injection molded articles can be improved if from about 0.2 to about 0.8, in particular about 0.5, % by weight of talc is present in the molding material. This improves the flowability, the demoldability and the surface smoothness of the shaped articles while reducing the required hydraulic pressure in the system.

The novel molding materials are also advantageous owing to their very low isotropic shrinkage of about 0.2% each in the longitudinal and transverse directions.

The molding materials can be particularly advantageously processed in injection molding apparatuses having a shut-off nozzle and a hot runner system, in order to produce optimum shaped articles in relatively good cycle times.

The molding materials have a density of greater than or equal to 1.4 g/cm$^3$, in particular of 1.48 g/cm$^3$.

The molding materials may advantageously contain, as pigments, chromium dioxide pigments which are finely divided and can be readily distributed in the molding material.

The molding materials moreover possess a volume flow index (MVI) of at least about 25 ml/10 min at 275° C./2.16 kg.

This further improves the injection molding properties, in particular with respect to polybutylene terephthalate molding materials.

Injection molded articles obtained from the novel molding materials advantageously have a relatively high density of greater than or equal to 1.4 g/cm$^3$, which is very advantageous for some applications. A further advantageous property of the injection molded article is obtained by the use of chromium dioxide pigment, since an essentially uniform anthracite color is achievable in conjunction with high gloss. As a further advantage of the injection molded article, the achievable shrinkage of said article is very low, being about 0.2% in the longitudinal and transverse directions. Dimensionally stable moldings can thus advantageously be produced.

A relatively high modulus of elasticity of ≧3200, in particular from about 3500 to about 3700, MPa/mm$^2$ makes the molding material interesting for many types of high-quality shaped articles. The modulus of elasticity was determined according to ISO standard 527-1 of 1993 using a universal tester, type 1455 (manufactured by Zwick GmbH, Ulm), at a test speed of 1 mm/min with a measuring length of 55 mm and an injection molded test specimen according to the above-mentioned standard of the type 1a (standard dumbbell). For use in injection molding, the molding materials should have a relatively low chlorine content of less than or equal to 0.5% by weight, in particular no chlorine content, in order to avoid corrosion of the injection molding apparatuses.

The thermoplastic molding material contains predominantly polyethylene terephthalate (PET) in an amount of from 37 to 96, preferably from 60 to 77, or from 50 to 60, or from 69 to 77, or from 41 to 50, % by weight.

Polyethylene terephthalate contains, in the main chain, an aromatic ring which is substituted by ethyl groups. Polyethylene terephthalate is a polyester of terephthalic acid and a $C_2$-diol component.

This polymer material preferably contains a polyurethane or polyurethane copolymers or condensates. Other suitable polymer materials are polyacrylates, polymethacrylates, polyacrylamide, vinyl polymers, such as polystyrene, polyvinyl propionate and polyacrylonitrile, cellulose-containing binders, such as cellulose esters, in particular cellulose nitrates, cellulose acetates, cellulose acetopropionate and cellulose acetobutyrate, phenoxy resins and epoxy resins.

The amount used as pigment reinforcing agent should be from 4 to 30, advantageously from 4 to 21 or from 20 to 30, % by weight.

Suitable pigment-like reinforcing agents are oxidic pigments, such as $\gamma$-$Fe_2O_3$, $\gamma$-$Fe_3O_4$ and $CrO_2$, and metallic pigments, such as Fe, Co and Ni. These pigments may contain further chemical elements and/or compounds. The pigments should have a mean average particle size of less than or equal to 400 nm. With the preferred use of chromium dioxide ($CrO_2$), the particle size is from about 250 to 300 nm. The metal and/or metal oxide pigments or particles can advantageously have a length/width ratio of from 5:1 to 15:1. In the case of $CrO_2$ pigments, this ratio is about 15:1.

Inorganic or organic pigments, for example alumina, silica, zirconium oxide, titanium oxide, carbon black, polyethylene, polypropylene and thixotropic substances, eg. amorphous silica, may be used as further pigment-like additives or fillers.

The thermoplastic molding material may contain, as lubricants and mold release agents, in principle up to about 1% by weight of carboxylic acids of 10 to 20 carbon atoms, such as stearic acid or palmitic acid, or derivatives, such as salts, esters or amides thereof, and esters of pentaerythritol with long-chain fatty acids.

It has proven advantageous for the molding materials if from about 0.2 to about 0.8, in particular about 0.5, % by weight of talc is admixed. This improves the injection molding properties and the demoldability and also further improves the flameproof properties of the moldings, which are achieved by the above-mentioned metal pigment and/or metal oxide pigment content, these pigments being used as synergistic agents with flameproofing additives known for polyesters, for example ethylenebistetrabromophthalimide and oligomeric tetrabromobisphenol A carbonates.

Polyurethane elastomers combined with relatively brittle polymers, such as phenoxy resins, polycarbonate and polyester resins, are used as polymer material for the purposes of the present invention. Such polyurethanes were prepared by reacting hydroxyl-containing polyethers or polyesters with isocyanates, and the polymer blends may also be crosslinked with polyisocyanates, for example if the brittle polymers concomitantly used have an OH group.

The preparation of a dispersion of the polymer material and the pigment, possibly also with the addition of the polyethylene terephthalate, may be carried out in a known manner, for example in a stirred mill with the addition of known dispersants, in such a way that the components are mixed with one another or dispersed. The addition of talc and/or other abovementioned fillers is also advantageous. The prepared dispersion can then be extruded in an extrusion apparatus, cooled and, for example, granulated.

It is also possible, for example, to premix the polymer material and the pigment and then add the PET and the talc and/or other fillers individually or likewise premixed. The mixing temperatures, as well as the subsequent injection molding temperatures, are from about 245° C. to 300° C., in particular from about 260° C. to about 290° C.

The novel thermoplastic molding materials possess good injection molding properties in cold runner, direct gating, sandwich and hot runner injection molding techniques with a shut-off needle system. The moldings produced therewith have relatively good mechanical and electrical properties (for shielding against electromagnetic waves) and particularly little distortion of the parts (dimensional stability). The molding materials are therefore suitable for the economical production of small parts, bobbins and mandrels for strip-like materials, housing parts of containers, in particular for the entertainment and data device industry (device housings, including accessories for these, such as housings for recording media, such as photographic films, etc.).

EXAMPLE

The following components were used:

A) A polyethylene terephthalate having a weight average molecular weight $\overline{M}_n$ of about 30,000 and a viscosity number of 73 ml/g (measured in a 0.5% strength by weight solution in phenol/o-dichlorobenzene (weight ratio 1:1) (Netralen® SP 3700$ from BASF Aktiengesellschaft, 67056 Ludwigshafen).

B) A polymer material consisting of an isocyanate resin Desmodur® from Bayer AG, Leverkusen, crosslinked with a partially branched polyester obtained from diacids, for example Desmolphen of the 2000 series from Bayer AG as a reactant and in particular di- or triols as crosslinking agents for regulating the course of the reaction.

C) A finely divided $CrO_2$ pigment having a particle size of from about 250 to about 300 nm and an acicular shape with a length/width ratio of about 15:1.

The components were dispersed in a weight ratio of about

70% by weight of component A,

10% by weight of component B and

20% by weight of component C as stated above and were mixed with one another with the addition of 0.5% by weight of talc, extruded and granulated. It is also possible first to prepare an agglomerate and then to mix with talc and to prepare granules.

Test specimens were prepared from these granules, and characteristic values were measured for the granules or for the test specimens in comparison with the BASF product Ultradur® B4300G2 stated at the outset.

| Technical property | I | II | Comparison |
| --- | --- | --- | --- |
| Granule | | | |
| Melt volume rate MVR 250°/2.16 Kp [ml/10 min] | | 19 | I at least equivalent to II |
| MVR 275°/0.16 Kp [ml/10 min] | 28.6 | | |
| Melting point (DSC) [° C.] | 244–253 | 220–225 | higher melting point of I |
| Injection molding | | | |
| Density [g/cm³] | 1.48 | 1.37 | I has higher density than II |
| Tensile modulus of elasticity [MPa] | 3200–3700 | 4500 | I about 20% lower |
| Yield point [MPa] | 74 | 85 | I about 13% lower |
| Stress at break [MPa] | 71 | 85 | I about 16% lower |

-continued

| Technical property | I | II | Comparison |
|---|---|---|---|
| Elonqation at break [%] | 3.9–4.5 | 3.8–4.1 | I about 10% higher |
| Impact strenqth [KJ/m$^2$] (+23° C.) | 28.4–29.7 | 45 | I about 33% lower |
| Ball indentation hardness (358 N)/Mpa | 160 | 160 | I = II |
| Coefficient of linear thermal expansion/10$^{-5}$ K (23–80)° C. | 5–9 | 4–5 | I 80% higher at maximum |
| Dielectric strength K20/P50 KV/mm | 61 | 100 | I 39% lower |
| Volume resistivity /Ω · cm | 1 · 10$^{16}$ | 1 · 10$^{16}$ | I = II |
| Shrinkage (test box) longitudinal/transverse/% | 0.2/0.2 | 0.8/1.2 | I 300% lower (longitudinal) I 500% lower (transverse) |

I Novel thermoplastic molding material
II Ultradur ® B4300 G2 (BASF AG)

The modulus of elasticity depends on the PET content and is about 3250 MPa with more than 90% by weight of PET up to about 3700 MPa with about 75% by weight of PET.

The novel thermoplastic molding material I was also tested with regard to the injection molding behavior and fulfilled the expectations. The melt temperature was about 270° C. at an injection pressure PE of from 18 to 50 bar and an after-pressure of 52 bar. The cycle time during the injection molding of test specimens was 30 or 40 P/sec. The injection molding apparatus used was a machine of the type Windsor SP 80/3 or Arburg 270E, having a locking pressure of 800 kN and 500 kN, respectively.

An injection mold having an open hot runner system proved to be unsuitable, and cold runner, direct gating, diaphragm gate and hot runner molds, the latter with a shutoff-needle system, therefore proved to be advantageously usable injection molds. The novel molding material is also advantageously suitable for processing by multilayer injection molding, for example by the coinjection method or by sandwich molding, in particular owing to the three-dimensional stability of the molding materials.

Further novel molding materials were injection molded to give test specimens in different shapes and weights, with the result that uniform plastification in combination with good demoldability with a smooth and glossy surface was achieved without coatings on the mold and burn spots on the test specimens. The screw diameter was 50 mm, the melt temperature was varied from 250° C. to 280° C. in 10 degree steps and the mold temperature was set at 50° C., 60° C., 75° C. and 90° C. The test specimens were produced both by the diaphragm gate method and by the pin-point gating method.

A thermoplastic molding material based on polyethylene terephthalate contains preferably from 37 to 96% by weight of PET, from 1 to 20% by weight of a polymer material containing preferably polyurethane, and from about 4 to 30% by weight of a pigment-like reinforcing agent comprising metal and/or metal oxide. The molding materials are suitable for processing by injection molding, and the shaped articles produced therefrom have advantageous properties, in particular with regard to a higher density and very little isotropic shrinkage in combination with a comparable modulus of elasticity compared with a similar polybutylene terephthalate (PBT) containing glass fibers as a filler.

The thermoplastic molding material can advantageously be used for small parts and for housing parts for electronic equipment and data devices.

We claim:

1. A thermoplastic molding composition containing
   A) from 37 to 96% by weight of a thermoplastic polyethylene terephthalate,
   B) from 1 to 20% by weight of a polymer material, and
   C) from 4 to 30% by weight of a reinforcing pigment, wherein
   the polymer material contains polyurethane, and
   the reinforcing pigment is selected from a group consisting of metal pigments and metal oxide pigments having a length/width ratio of from 5:1 to 15:1 and a particle size of not more than 400 nm, optionally admixed with further pigments or reinforcing agents.

2. The molding composition defined in claim 1, containing
   A) from 50 to 77% by weight of the thermoplastic polyethylene terephthalate,
   B) from 4 to 20% by weight of the polymer material, and
   C) from 4 to 30% by weight of the reinforcing pigment.

3. The molding composition defined in claim 2, which can be injection molded into a shaped article at a melt temperature of from about 245 to 300° C.

4. The molding composition defined in claim 1, having a moisture content of not more than 0.1% by weight of the molding composition.

5. The molding composition defined in claim 1, having a moisture content of not more than 0.05% by weight of the molding composition.

6. The molding composition defined in claim 1, which contains carboxylic acids of 10–20 carbon atoms in an amount of up to 1% by weight of the molding composition.

7. The molding composition defined in claim 1, which contains talc and an amount of from 0.2 to 0.8% by weight of the molding composition.

8. The molding composition defined in claim 1, which contains talc in an amount of about 0.5% by weight of the molding composition.

9. The molding composition defined in claim 1, which can be processed in an injection molding apparatus having a shut-off nozzle and a hot runner system.

10. The molding composition defined in claim 1, which can be processed in an injection molding apparatus having a cold runner system.

11. The molding composition defined in claim 1, which can be processed by multilayer injection molding or by sandwich molding.

12. The molding composition defined in claim 1, which can be processed by multilayer coinjection molding.

13. The molding composition defined in claim 1, which has a density of $\geq 1.4$ g/cm$^3$.

14. The molding composition defined in claim 1, which has a density of $\geq 1.48$ g/cm$^3$.

15. The molding composition defined in claim 1, wherein the volume flow index (MVI) is at least about 25 ml/10 min at 275° C./2.16 kg.

16. The molding composition defined in claim 1, wherein the reinforcing piament consists of Cro$_2$ pigments.

17. A shaped article obtained from the thermoplastic molding composition defined in claim 1.

18. The shaped article defined in claim 17, which is produced by injection molding and has a modulus of elasticity of $\geq 3200$, MPa/mm$^2$, measured according to ISO standard 527-1/1993.

19. The shaped article defined in claim 17, which is produced by injection molding and has a modulus of elasticity of from about 3500 to about 3700 Mpa/mm$^3$, measured according to ISO standard 527-1/1993.

20. The molded article defined in claim 18, which has a low shrinkage of about 0.2% each in the longitudinal and traverse directions.

21. The molding composition defined in claim 7, which has a chlorine content of not greater than 0.5% by weight, based on the weight of the molding composition.

22. The molding composition defined in claim 7, which is free of chlorine.

* * * * *

UNITED STATES PATENT AND TRADEMARK OFFICE
CERTIFICATE OF CORRECTION

PATENT NO.: 6,046,264

DATED: April 4, 2000

INVENTOR(S): MÜLLER et al.

It is certified that error appears in the above-identified patent and that said Letters Patent is hereby corrected as shown below:

On the title page, the abstract should read as follows:

--A thermoplastic molding composition which has advantageous properties when compared with glass fiber reinforced polyethylene terephthalates contains A) from 37 to 96% by weight of a thermoplastic polyethylene terephthalate,
B) from 1 to 20% by weight of polyurethane containing polymer material, and
C) From 4 to 30% by weight of a pigment, which is selected from metal pigments and/or metal oxide pigments having a length/width ratio of from 5:1 to 15:1 and a particle size of not more than 400 nm, optionally admixed with further pigments or reinforcing agents.--

Column 6, claim 1, line 17, change "pignents" to --pigments--.

Column 6, claim 7, line 38, change "and" to --in--.

Column 6, claim 16, line 62, change "piament" to --pigment agents--; and "Cro$_2$" to --CrO$_2$.

UNITED STATES PATENT AND TRADEMARK OFFICE
CERTIFICATE OF CORRECTION

PATENT NO. : 6,046,264
DATED : April 4, 2000
INVENTOR(S) : Muller, et al.

It is certified that error appears in the above-identified patent and that said Letters Patent is hereby corrected as shown below:

Column 7, claim 19, line 3, change "Mpa" to --MPa--.

Signed and Sealed this

Sixth Day of March, 2001

NICHOLAS P. GODICI

Attest:

Attesting Officer

Acting Director of the United States Patent and Trademark Office